G. E. HERRMANN & B. W. TUCKER.
BARREL.
APPLICATION FILED DEC. 30, 1916.
1,286,628.
Patented Dec. 3, 1918.
2 SHEETS—SHEET 1.
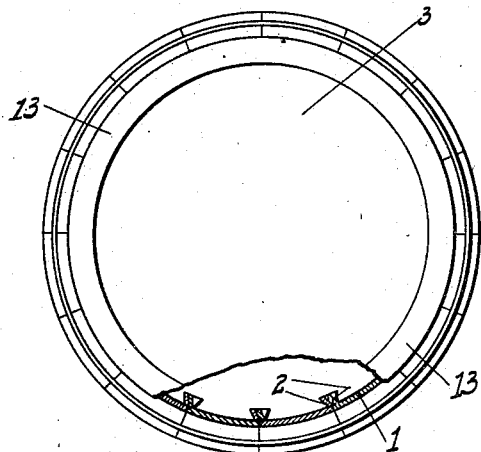
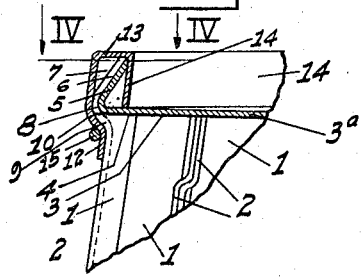
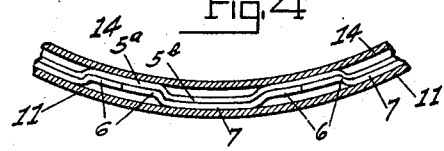
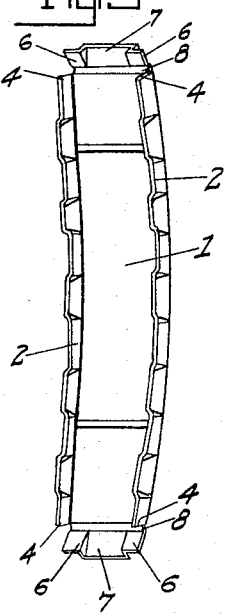
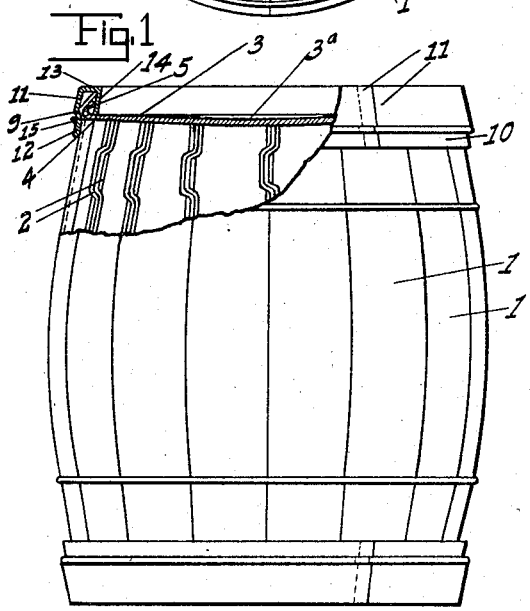
Inventor
G. E. Herrmann & B. W. Tucker
By
Their Attorneys
Crisnell & Davis

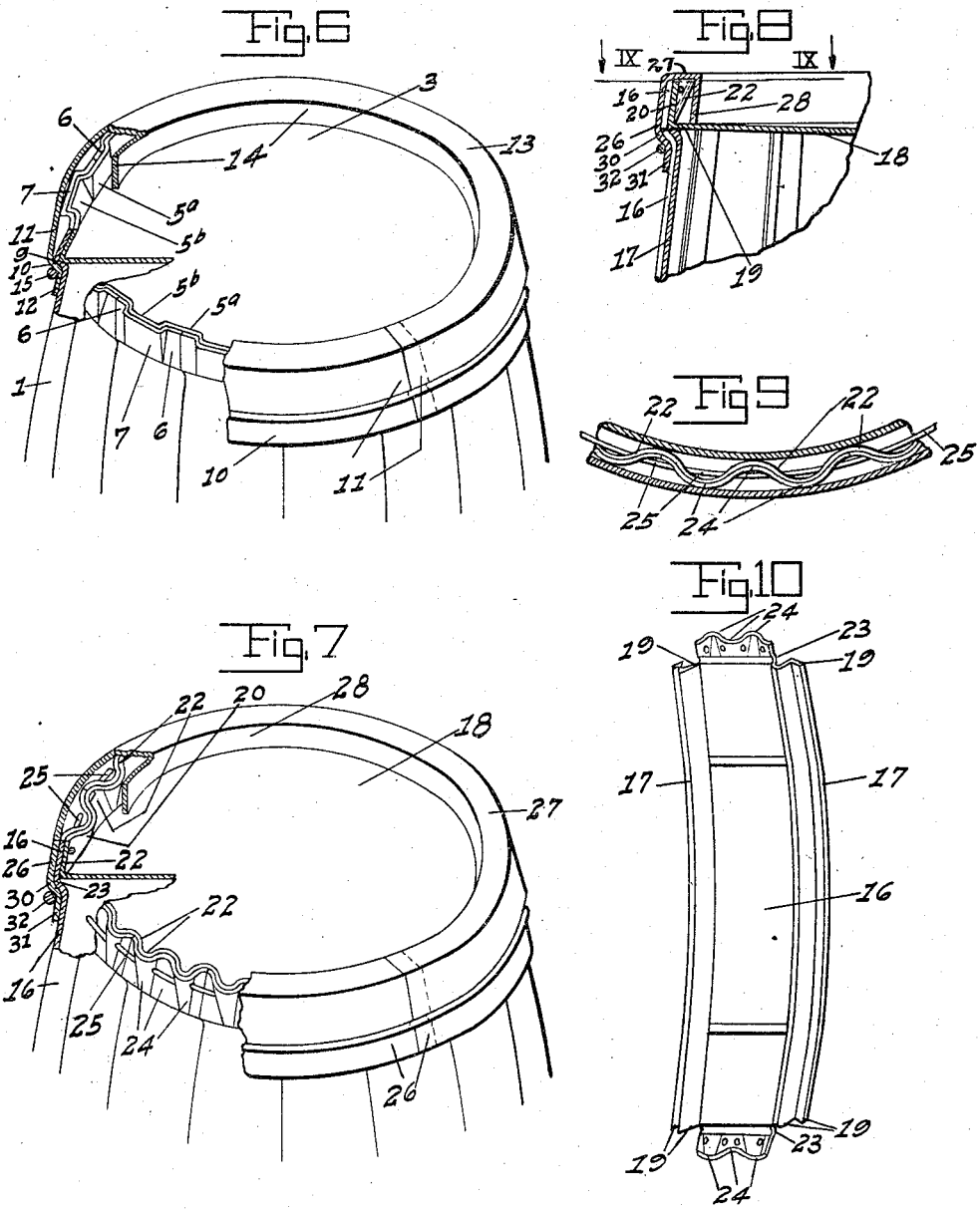

UNITED STATES PATENT OFFICE.

GEORGE E. HERRMANN, OF MORRISTOWN, AND BENJAMIN W. TUCKER, OF SOUTH ORANGE, NEW JERSEY; SAID TUCKER ASSIGNOR TO SAID HERRMANN.

BARREL.

1,286,628.  Specification of Letters Patent.  Patented Dec. 3, 1918.

Continuation in part of applications Serial Nos. 677,899 and 677,900, filed February 16, 1912. (Patents Nos. 1,216,805 and 1,216,806; dated February 20, 1917.) This application filed December 30, 1916. Serial No. 139,776.

*To all whom it may concern:*

Be it known that we, GEORGE E. HERRMANN and BENJAMIN W. TUCKER, citizens of the United States, and residents of Morristown, county of Morris, State of New Jersey, and of South Orange, county of Essex, and State of New Jersey, respectively, have invented certain new and useful Improvements in Barrels, of which the following is a specification.

This invention relates more particularly to barrels or other containers made of sheet steel.

The primary object of the invention is the provision of simple and effective means for securely holding a head at either or both ends of the container body.

A further important object of the invention is to provide simple means whereby either or both heads of the barrel or container may be interlocked with the staves or members.

Another important object of the invention is the provision of simple means for rigidly holding and tying the interlocked head and staves or body members together.

A further object is the provision of means for preventing crushing of the ends of the staves or body members.

In the drawings, Figure 1 is a side elevation, partly broken away and partly in section, of a barrel, showing one embodiment of the invention;

Fig. 2 is a plan view, partly broken away and partly in section, of the barrel shown in Fig. 1;

Fig. 3 an enlarged fragmentary section of part of the barrel shown in Fig. 1, showing one means for locking the barrel head and staves together and for strengthening the ends of the barrel;

Fig. 4 a sectional plan view taken on the line IV—IV of Fig. 3;

Fig. 5 a detail perspective view of one of the staves of the form of barrel shown in Figs. 1 to 6;

Fig. 6 a detail perspective of one end of the form of barrel shown in Figs. 1 to 5, a portion of the barrel being broken away;

Fig. 7 a view similar to Fig. 6, showing another embodiment of the invention;

Fig. 8 a view similar to Fig. 3, of the form of barrel shown in Fig. 7;

Fig. 9 a view similar to Fig. 4, taken on the line IX—IX of Fig. 8; and

Fig. 10 a detail perspective view of one of the staves of the form of barrel shown in Figs. 7 to 9.

While the invention is shown embodied in barrels having a bilged or enlarged central portion, it will be understood that the invention may be applied to other forms of containers.

This application is a continuation in part of each of our copending applications, Serial No. 677,899, filed February 16, 1912, allowed May 23, 1916, and Serial No. 677,900, filed February 16, 1912, allowed May 23, 1916, in so far as this application contains subject matter, relating to improvements in head constructions for barrels, shown but not claimed in said co-pending allowed applications for patent.

In Figs. 1 to 6, inclusive, is shown the embodiment of our invention disclosed but not claimed in said application Serial No. 677,899, and in Figs. 7 to 10 inclusive, is shown the embodiment of our invention disclosed but not claimed in application Serial No. 677,900.

Referring more particularly to the embodiment of the invention shown in Figs. 1 to 6, the barrel body is formed of a plurality of staves or members 1, formed with inwardly extending flanges 2 at the sides thereof. These flanges are shown as interlocking flanges of the form described and claimed in application Serial No. 677,899, above referred to, but they may be of any other suitable construction. The flanges 2 extend the greater portion of the length of the staves and project inwardly from the body portion of the stave.

A head 3 has its body concaved slightly inwardly, as shown at $3^a$, and said head is adapted to rest upon the shoulders 4 formed by the ends of the flanges 2 of the barrel staves, which flanges extend the greater part of the length of the staves but not the entire length thereof. A head and its fastening means may be arranged at both ends of the barrel body, or at only one end thereof, as preferred, the other end being closed in any desired way. Each head 3 is provided with an outwardly extending flange 5, the said flange being corrugated peripherally as shown best in Figs. 4 and 6. These corrugations may be formed in any suitable way and the said flange may be divided to adapt the corrugations to be formed, or the said flange may have its corrugations pressed directly out of the flange portion and thereby utilize the surplus metal. The corrugations are formed by oppositely projecting parts or portions 5ª and 5ᵇ, these projections alternating throughout the entire circumference of the head, and each projecting portion forming a groove or recess. The recess formed by the projecting portion 5ª is adapted to receive the parts 6 of the ends of the staves. Located between the parts 6 of the stave ends is a projecting portion 7. The projecting portion 7 of each stave end forms a recess to receive one of the projecting parts 5ᵇ of the barrel head, the said projecting parts 7 being angularly disposed to correspond to the angular arrangement of the projection 5ª and 5ᵇ of the flange 5 of the head 3, thus holding the staves against sidewise movement relative to the barrel heads and serving further to interlock with the heads and to strengthen the ends of the barrel. The ends of the barrel staves are offset to provide grooves 8 which, when the barrel is assembled, forms a substantially continuous groove or croze for the outer edge of each of the barrel heads adjacent the shoulders 4 formed by the ends of the stave flanges 2. The staves at the offset portion form an external shoulder 9, and fitting against the shoulder 9 is the inwardly bent part 10 of a split compression band or member 11. This band or member 11 has a skirt portion 12 which extends for a short distance lengthwise of the barrel staves. The band 11 has an inwardly extending horizontal flange 13 and a second annular flange 14 depending from the inner edge of flange 13, substantially parallel with the body portion 11 of said band. The flanges 13 and 14, and body part 11, form a substantially U-shaped annular channel to receive the interlocked ends of the staves or members and the flanges 5 of the barrel head which are confined between said body part 11 and flange 14.

A wire or other band 15 is located under the shoulder 9 around the exterior of the split ring or member 11, so that when the ends of the wire are twisted or otherwise held together, the member 11 may be compressed and thereby rigidly hold the stave or member and the heads together, and at the same time strengthen the barrel at its ends.

Referring to the embodiment of the invention shown in Figs. 7 to 10, the staves 16 are formed with inwardly extending interlocking flanges 17. As shown, these flanges are formed as described in application Serial No. 667,900, above referred to, but they may be of any other suitable construction. The flanges 17 extend the greater portion of the length of the staves and project inwardly.

A head 18 may be located at each end of the barrel body and has its body portion adapted to rest upon the ends 19 of the stave flanges 17. A head similar to that shown may be arranged at each end of the barrel body, or at one end only, as preferred, and each head is provided with an outwardly extending flange 20 which has corrugations 22 arranged throughout the entire periphery thereof, as shown best in Figs. 7 and 9. These corrugations may be formed in any desired way, and the said corrugations increase in depth from the outer edge of the body 18 of the heads to the outer edge of the flange 20. The staves or members are offset at 23 to form a seat or croze for each head, and extending beyond the offset portion is a portion having corrugations 24 corresponding to the shape of the corrugations of the flange of the head, the corrugations at the ends of the staves or members being adapted to fit and interlock with the corrugations 22 of the flange 20. A wire or other element 25 is adapted to pass through alined apertures in the corrugations 22 of the head flange and the interlocking corrugations 24 of the ends of the staves or members 16. The ends of the wire or element 25 may be bound together by twisting or otherwise, and when thus held the staves and barrel heads will be secured against relative movement, though it will be understood that this element may be used or not, as desired. The staves or members and the heads may be further secured and held together at each end by a band or member 26. This band or member 26 is split and annular in form in order that it may be compressed. The band has a horizontal outer portion 27 and two substantially parallel depending portions 26 and 28 which form an annular recess or chamber to receive the interlocked ends of the staves and flange of the barrel head. The portion 28 of the band 26 extends downward, and, at its inner or lower edge, rests against the body 18 of the head. The band or member 26 is offset at 30, to provide a shoulder under the offset portion 23 of the barrel staves, and has a skirt portion 31 which extends downward a short distance along the staves or members. A wire or other band 32 extends around the member 26 under the shoulder 30, so that when the ends are twisted or otherwise held together the said band or member 26 may be compressed and the parts rigidly locked together.

From the foregoing it will be seen that simple and efficient means has been provided for rigidly supporting the barrel heads; that thrust on said heads is resisted by the ends of the vertical staves and stave flanges; that simple means has been provided for so interlocking the heads and ends of the staves that lateral and vertical movement of the staves is prevented; that the staves and heads and connecting means are so constructed that liability of crushing the stave ends is obviated; and that said barrel or container is inexpensive to manufacture, may be readily assembled, and that the head may be readily removed when desired.

What we claim is:

1. A barrel or other container, comprising a plurality of members having offset portions at the ends thereof adapted to provide seats, heads located within the body of the container and adapted to rest against said seats, each head being provided with a vertically corrugated projecting flange, said members having a depressed portion adapted to receive one of the corrugated portions of the head, a split band having substantially parallel flanges forming an annular chamber for the ends of the members and the flanges of the heads, one of said flanges of each band being adapted to extend inward and rest against the body of one of the heads, and tightening wires for compressing the band to lock the members, band and heads together.

2. A barrel or other container comprising a plurality of members having an offset portion at the ends thereof adapted to provide a seat, a head located within the body of the container and adapted to rest against said seat, the head being provided with a vertically corrugated projecting flange, said members each having a depressed portion adapted to receive one of the corrugated portions of the head, a split band having substantially parallel flanges forming an annular chamber for the ends of the members and the flanges of the head, one of said flanges being adapted to extend inward and rest against the body of the head, and means for compressing the band to lock the members, band and head together.

3. A barrel or other container comprising a plurality of members, each provided with offset vertically corrugated ends, heads seated in said offset ends and provided with vertically corrugated flanges adapted to interlock with the corrugated portions of the members, annular compression members covering the interlocked heads and flanges, and means for compressing and holding said compression member against the container body beneath the offset corrugated ends.

4. A barrel or other container comprising a plurality of members having perforated corrugated ends, said corrugations increasing in depth toward the outer ends of the members, a head provided with a vertically corrugated outwardly extending flange portion adapted to interlock with the corrugated ends of the members, said corrugations increasing in depth from the body of said head to the outer edge of the flange and being provided with apertures, a tying element passing through the apertures in the interlocked flange and members, a band having substantially parallel flanges connected together and forming an annular recess to receive the interlocked ends of the members and the flange of the head, and means for compressing the outer flange of the band to lock the parts together.

5. A barrel or other container comprising a plurality of members having vertically corrugated ends, said corrugations increasing in depth toward the outer ends of the members, a head provided with a vertically corrugated outwardly extending flange portion, said corrugations increasing in depth from the body of said head to the outer edge of the flange and being adapted to interlock with the corrugated ends of the members, an annular channel-shaped compression band embracing the interlocked ends of the members and head flange, and means for compressing and securing the band to the members.

In testimony whereof we hereunto affix our signatures this 29th day of December, 1916.

GEORGE E. HERRMANN.
BENJAMIN W. TUCKER.